United States Patent [19]
Albert et al.

[11] Patent Number: 5,371,336
[45] Date of Patent: Dec. 6, 1994

[54] DEVICE FOR CONTACT-FREE DATA GATHERING FROM A THERMAL MACHINING SYSTEM

[75] Inventors: Hans-Joachim Albert, Hofheim-Lorsbach; Eckhardt Bergmann, Freiburg; Reinhard Henrici, Eschhofen, all of Germany

[73] Assignee: Messer Griesheim GmbH, Germany

[21] Appl. No.: 954,020

[22] Filed: Sep. 30, 1992

[30] Foreign Application Priority Data

| Oct. 1, 1991 | [DE] | Germany | 4132649 |
| Oct. 1, 1991 | [DE] | Germany | 4132651 |
| Nov. 18, 1991 | [DE] | Germany | 4137835 |
| Feb. 8, 1992 | [DE] | Germany | 4203672 |

[51] Int. Cl.$^5$ .................................. B23K 10/00
[52] U.S. Cl. .................. 219/121.54; 219/121.56; 219/124.34; 219/121.39
[58] Field of Search ............ 219/121.54, 121.56, 219/121.57, 124.02, 124.34, 130.21, 130.33

[56] References Cited

U.S. PATENT DOCUMENTS

| 4,052,584 | 10/1977 | Reznicek | 219/69 M |
| 4,280,042 | 7/1981 | Berger et al. | 219/121.57 |
| 4,298,784 | 11/1981 | Schmall | 219/124.02 |
| 4,324,971 | 4/1982 | Frappier | 219/121.54 |
| 4,333,052 | 6/1982 | Schmall | 219/124.34 |
| 4,652,821 | 3/1987 | Kreft | 324/208 |
| 4,767,907 | 8/1988 | Otani et al. | 219/121.56 |
| 4,827,213 | 5/1989 | Spaude | 219/124.34 |
| 5,043,554 | 8/1991 | Kohsaka et al. | 219/121.39 |

*Primary Examiner*—Mark H. Paschall
*Attorney, Agent, or Firm*—Connolly & Hutz

[57] ABSTRACT

The invention relates to a device for contact-free data gathering from a thermal machining system with at least one machining tool and one workpiece which is characterized in that the workpiece is connected to an alternating voltage generator and receives an alternating voltage signal, as a result of which it functions as a transmitter and in that, across from the workpiece, there is a receiver which is connected to an evaluation unit which picks up field changes.

29 Claims, 7 Drawing Sheets

DEVICE FOR CONTACT-FREE DATA GATHERING FROM A THERMAL MACHINING SYSTEM

BACKGROUND OF THE INVENTION

The invention relates to a device for contact-free data gathering from a thermal machining system with at least one machining tool and one workpiece.

A workpiece such as a metal plate or the like can be cut into the desired shape with a cutting torch or a laser cutting head by means of which a cutting beam is aimed at the surface and it then cuts through the workpiece.

In general, the cutting torch is mounted in a mobile holder so that the cutting torch can move along the workpiece in the desired pattern. The distance between the torch nozzle and the workpiece must be constant so that an optimal cutting of the workpiece is achieved and maintained. If the distance between the torch nozzle and the workpiece is too small, then uneven spots in the workpiece can cause contact with the tip of the torch, thereby extinguishing the flame and interrupting the cutting of the workpiece. If the distance is too great, this can impair the cutting quality and the cut will be interrupted. In the case of laser cutting, great distance changes cause a shift in the position of the focal point in the metal and it is no longer possible to cut.

It is known that distances to workpieces are measured with capacitive measuring methods and that the holder of the cutting torch is kept at a constant height above the surface of the workpiece via a closed control circuit (West German patent no. DE 26 41 851 A1, East German patent no. DD 225 651 A1).

In the case of capacitive distance measurement, sensor elements are used in the vicinity of the torch nozzle, and these sensor elements are designed in the shape of a ring, horseshoe or plate. Since they are located in the hot or spraying area of the cutting beam, they only have a short service life and must be replaced at regular intervals.

In order to obtain an adequately strong measuring signal with the known models, as a rule, annular sensor elements with large diameters are used, which are disadvantageous whenever the end edge of the workpiece runs close by or whenever workpieces have already been cut out of the workpiece plate in the immediate vicinity, so that the sensor element is no longer positioned completely above the surface of the workpiece. This leads to erroneous measuring signals.

In the case of devices with an oscillator circuit and a frequency-determining capacity with a subsequent PLL circuit or the like, LC combinations are also necessary in the vicinity of the sensor elements. In actual practice, this calls for a positioning of electronic components in the hot area of the cutting process and a large diversity of parts for the different machines and torch models. Moreover, due to the high-voltage ignition systems used, high field strengths and severe electromagnetic interferences occur. The interference contours at the torch are increased. Thus, although the known devices fulfill the required functions in all kinds of different systems, the mechanical, electrical and electronic complexity is very great. Individual mechanical and electrical design elements of the thermal machining system lead to changeable parasitic capacities which enter into the distance measurements; these elements include factors such as the size of the torch carriage, the type, size and shape of the cutting torch, the type of the nozzles and nozzle caps, type of gas, marking tools, torch holders, distance to adjacent torches when the height of the individual torch shifts as well as, in the case of multiple torch aggregates, additional mounted elements in the vicinity of the torch and process fluctuations typical in actual practice with electric arcs as well as with autogenic and laser processes as well as the cable lengths used, whose capacity and plug-and-socket connections in the measuring circuit and transition resistances, for example, in slip rings with infinitely rotatable aggregates.

Moreover, it is also known that thermal influences have an impact on electronic components in the vicinity of the torch as well as on the capacity of cables and plug-and-socket connections and, especially in the case of frequency-based devices, these influences can lead to drifting during operation. The dynamic range of such devices is currently only a distance of a few millimeters from the nozzle to the sheet (workpiece) and calls for a complex and precise adjustment of the sensor elements.

An arrangement to compensate for interfering emissions of electromagnetic high-frequency vibrations with contact-free sensing devices is described in German patent no. DE 30 42 781 A1.

Moreover, a device for contact-free determination of the position and/or the dielectric properties of objects is known for use in an annealing furnace; this device sensitively detects any interference in an electrical alternating field. It consists of an arrangement of three electrical conductors, two of which are operated as field-generated transmission electrodes with a low-frequency, opposite-phase alternating voltage, whereas the third conductor serves as a current-sensitive measuring electrode. The results of frequency-sensitive and phase-positive processing of the measuring signals is a high measuring sensitivity and a great insensitivity to electrical interference effects (European patent no. EP 0 038 551 B1).

In this context, the direction-dependence of the two transmission electrodes is detrimental during cutting processes since such processes also involve cutting in a plane in any desired direction at any time. The distorting effect of cut joints on the measured value is especially great when the cut is made in the direction of the sensor electrodes. Furthermore, installing two transmission electrodes in the vicinity of the torch entails great mechanical difficulties.

Moreover, an inductive device is known which consists of at least one receiving coil and at least one primary excitation coil connected to a HF generator for inducing voltage values which can be predetermined in the undisturbed state and which have opposite polarity in the receiving coil. In order to compensate for errors and deviations in the induction in the receiving coil, there is at least one additional excitation coil which generates a compensation field or compensation voltages in the receiving coil (European patent no. EP 0 300 974 A1).

In addition to the physically differing signal stabilities and interference voltage distances that exist for the various measuring methods, the state of the art makes it possible to achieve the necessary functions in the different systems, but the influences stemming from the occurrence of plasma and thus of differing conductivities and parasitic capacities in the area of the sensor elements or of the measuring electrodes lead to complicated subsequent electronic correction measures of the distance signal. The actual measurement distance between the sensor elements and the workpiece is affected. The autogenic flame, the plasma light arc or the laser beam, etc., influence and distort the measured values of capacitive sensor systems in various ways, depending on the process and on the process state.

The result is that there are large differences between the positions of the tools to the sheet metal which can be achieved with and without plasma. The effect is negative for the cutting process as well as for the automation of the machine.

In most cases, during the individual cutting phases, an incorrect distance measurement which is detrimental to the cutting quality and consequently an incorrect height of the nozzle above the sheet has to be accepted as a compromise. In order to avoid cutting interruptions during autogenic welding as a result of flashbacks, for example, excessive distances often have to be maintained during the cutting operation, with the result that the quality of the cut deteriorates and the effectiveness of the process decreases or else the cutting speed is too low. Conversely, if the distances are too great, an inadequate power density can interrupt the cutting process.

Furthermore, a state of the art is known in which the capacitive annular distance sensor is arranged concentrically around the torch nozzle, and its distance to the workpiece is greater than that of the torch nozzle. In addition to detecting the distance, this sensor ring also serves to detect a collision of the sensor ring and the workpiece if the sensor comes into lateral contact with the workpiece in the case of a horizontal movement path. An interactive electronic system evaluates the contact and activates the subsequent control steps in order to move the torch with the torch nozzle out of the danger zone.

The lower torch nozzle is not protected by the state of the art, especially in the case of a vertical movement path.

SUMMARY OF THE INVENTION

The invention is based on the task of creating a device for contact-free data gathering from a thermal machining system which is not sensitive to thermal as well as machine-related and process-specific influences and which allows a simplification of the overall technical complexity.

The device according to the invention with which the task is solved is characterized in that the workpiece is connected to an alternating voltage generator and receives an alternating voltage signal, as a result of which it functions as a transmitter and in that, across from the workpiece, there is a receiver which is connected to an evaluation unit which picks up field changes.

The invention achieves a high level of insensitivity to electrical interferences and temperature-related environmental influences, whereby the design of the workpiece as a transmitter makes it possible to cut in any direction and whereby the symmetrical/concentric position of the receiver around the torch makes it possible to achieve freedom of direction. In addition, no separate transmission electrodes have to be located in the temperature-stressed area between the transmitter and the receiver. This considerably simplifies the mechanical design of the system.

A feature of the invention is to translate into a higher output voltage of the workpiece which functions as a transmitter, as a result of which a larger interference voltage distance of the distance signal is achieved.

In a preferred embodiment the entire electronic system of the device is potential-free with respect to the surroundings. The measuring method itself makes this possible.

Furthermore, it is advantageously possible—by means of various methods, for example, potentiometric or remote-controlled—to realize various working distances or adaptations to the receiver forms, since a changeable alternating voltage is fed to the preamplifier via a line with a capacitor.

The invention makes it advantageously possible to measure a differential alternating field with one transmitting and one receiving electrode.

Additionally the invention makes it advantageously possible—via a computer interface (e.g. parallel, serial or bus system)—to automatically preselect a set point value, whereby the values, for example, are taken from a technology database. It is also possible to construct a closed control circuit which allows an automatic zero balance for a new freely selected height. Likewise, during the cutting operation, a new, defined height, offset information, offset compensation, programmed distance sequence depending on the machine, the workpiece, the process, etc., can all be implemented.

The invention further makes it advantageously possible to use a simple potentiometer to feed in the necessary compensation voltage for the zero balance of the sensor via the fixed capacitor in the preamplifier. If the potentiometer is replaced by a D/A transformer, remote control is possible.

The invention also makes it advantageously possible to minimize the interference effects of neighboring sensors when several sensors are used on one workpiece.

With the invention it is also advantageously possible to use smaller sensor elements, especially smaller sensor rings, since an increase in the measuring accuracy for detecting the alternating fields which are emitted from the workpiece as the transmitting antenna is achieved by a high directional effect. The connection pieces designed as coaxial conductors advantageously ensure a field detection primarily in the direction of a transmitter which, in an advantageous embodiment, is formed by the workpiece.

Advantageously, components can be nested in close proximity to each other since only small sensor elements are needed which do not protrude into the adjacent area of the neighboring cutting torch. This means that the workpiece plate can be better utilized. The cost-effectiveness of a thermal or waterjet machining system can be considerably increased.

Due to other features of the invention, the shielding sockets are advantageously connected to the holding mechanism so as to be electrically conductive at a small transition resistance. The torch is set at the reference potential of the sensor.

The invention further allows a free sliding possibility along a translational degree of freedom Z after a screw is loosened. The sliding path is limited by an adjustable stop and by a fixed stop, and it can be adjusted for different types of torches and nozzles. In the working position, the lower stop can be used to achieve a reproducible adjustment. This stop can be at a fixed distance from the holding mechanism or can be designed so as to be adjustable. The linear sliding of the connection piece makes it possible to carry out a fine adjustment of the sensor elements with respect to the tool or to the torch nozzle without the need for disassembly work. Radially positioned dimension lines or verniers on the outer mantle of the connection block allow a reproducible adjustment of the sensor element with respect to the positions of the nozzle and/or torch. The relative shifts in the holders between the burner middle axis and the sensor element which occur with the use of torches with different diameters are corrected by a rotational degree of freedom after the clipped connection is undone.

Other characteristics of the invention make use of a forced guide to ensure the coaxial positioning even under mechanical and thermal stress. The penetration of cutting dust particles into the coaxial conductor is prevented. The output capacity remains constant.

Further characteristics of the invention advantageously reduce the interference effects of different plasmas such as the kind that arise between flame and sensor ring and/or tool and/or nozzle or nozzle cap on the capacitive distance systems of a torch cutting machine, because the tools, for example, cutting torches, are at the same reference potential as the frequency-generating generator of the sensors. This measure ensures that, during the sensor balancing, a certain parasitic capacity which occurs at the working height of the torch nozzle above the sheet metal to be processed is also balanced and thus cannot have an influence on the sensor signal. If the tool such as the torch or the nozzle or the nozzle cap is connected to the machine mass, then an ohmic resistance is produced between the workpiece and the torch or the nozzle or the nozzle cap when the flame or the arc is ignited or due to the ionization and plasma cloud that arises in the case of laser cutting. This resistance brings about an apparent increase in the workpiece mass with respect to the sensor element. Since in the case of the tool being related to the machine mass, the measuring capacity C1 is permanently balanced at the rated working distance of the nozzle to workpiece, the above-mentioned conditions are interpreted as an apparent approximation of the sensor ring towards the workpiece. C3 is formed parallel to C1 and increases the total capacity. Therefore, the torch moves upwards in a closed control circuit. If the tool is at potential-free electronic zero, likewise a plasma-induced resistor R1 is formed. The capacity adds up only proportionally to C1, so that only slight or no distance change occurs in the closed control circuit when plasma is present.

DETAILED DESCRIPTION

Figure 1:
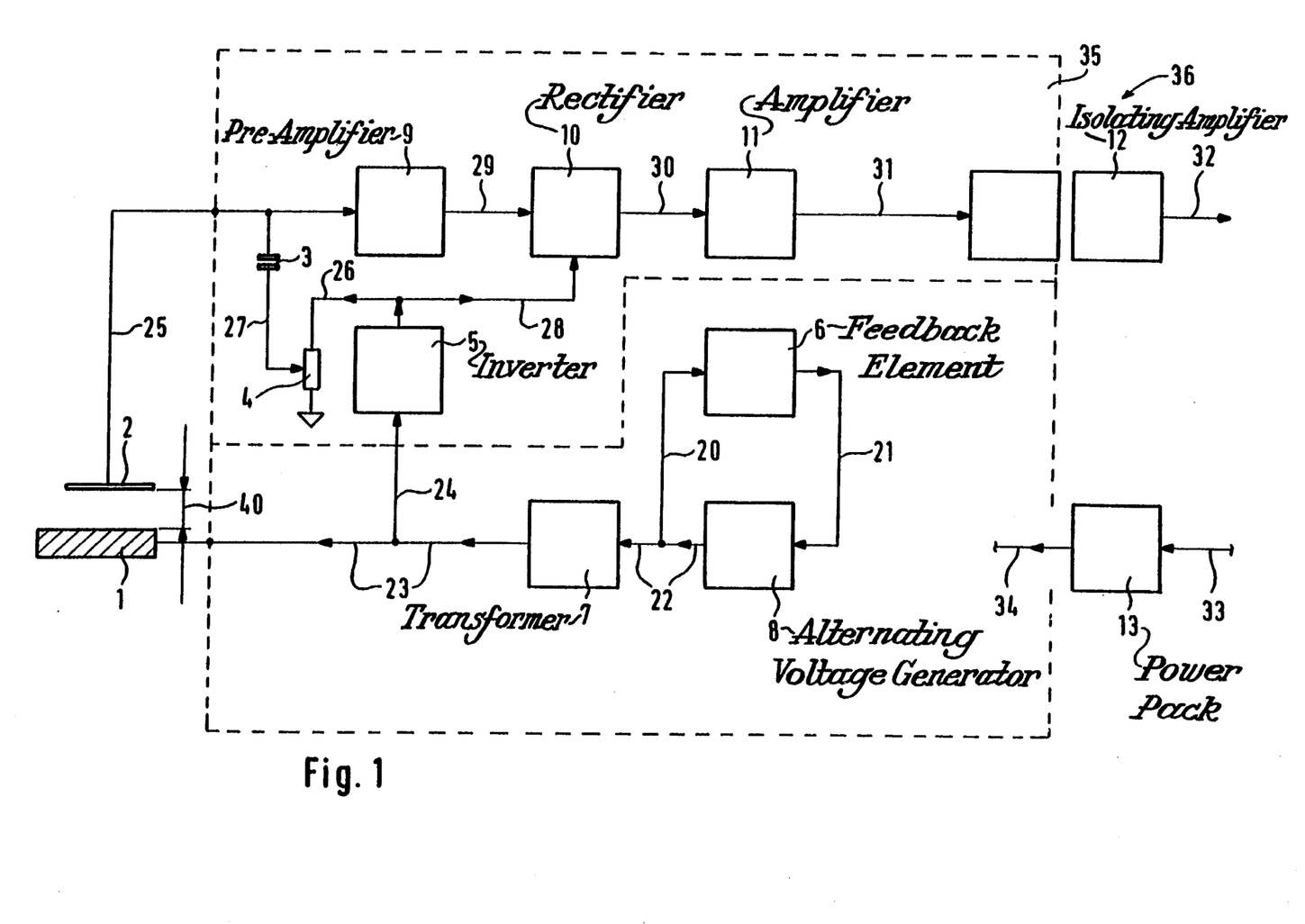
FIG. 1 is a block diagram of the device for generating a distance signal according to the invention.

FIG. 1 shows a schematic block diagram of the device 36 according to the invention. The device consists essentially of an evaluation unit 35 which is connected via a line 25 to the receiver 2 and of the workpiece 1, which is designed as a transmitter. For this purpose, the workpiece 1 is connected with an alternating voltage generator 8 which generates an amplitude-stabilized sinusoidal alternating voltage signal by means of the feedback element 6 via the lines 20 and 21 as an amplitude control. This alternating voltage signal is transformed via line 22 and transformer 7 into a high voltage and then connected to the workpiece 1 via line 23. The increased alternating voltage advantageously brings about a high interference voltage distance and constant high-signal dynamics, also above large machines and workpieces.

In the inverter 5, this sinusoidal alternating voltage signal is phase-rotated by 180° from the transformer 7 and the lines 23, 24 and then fed via line 26 and a potentiometer 4 (adjustment element), line 27 and coupling capacitor 3 to the input of the preamplifier 9. Moreover, the phase-rotated signal is fed via line 28 as a frequency reference signal to the rectifier 10 (phase discriminator). The coupling capacitor 3 can be designed in such a manner that an adequately high alternating voltage of the half-bridge can be adjusted via potentiometer 4 for all receivers 2, dielectrics and torch environment models which occur in actual practice.

Instead of the potentiometer 4, it is also possible to use a D/A transformer, whereby then the reference input of the D/A transformer can receive the 180° phase-rotated signal from the inverter 5 and the analog output of the D/A transformer can be connected with the coupling capacitor 3.

The alternating voltage field transmitted by the workpiece 1 is received by the receiver 2 (reception antenna) and fed to the preamplifier 9 via line 25. If the level of the alternating voltage received by the receiver is equal to that of the alternating voltage which is phase-rotated by 180°, then the two alternating voltages cancel each other out to zero at the input of the preamplifier 9.

The preamplified, superimposed sinusoidal alternating voltage from the inverted signal is fed via line 24, inverter 5, line 26, potentiometer 4, line 27 and coupling capacitor 3 and the signal via receiver 2 and line 25 to the phase discriminator 10 with possible phase shifts as a result of distance changes 40 after which it is rectified phase-sensitively. An adjustment of the receiver 2 to other distances 40 from the workpiece 1 leads to a direction-dependent direct voltage signal, which is fed to the amplifier 11 via line 30. The prerequisite is the zero compensation via potentiometer 4 at the desired working height.

After amplification in the amplifier 11, the direct voltage obtained is made available potential-free to the control circuit of a subsequent torch height adjustment mechanism or the like via line 31 as an analog output voltage of the receiver via the isolating amplifier 12 and line 32.

All in all, the measuring system is completely potential-free since, in addition to the isolating amplifier 12, no potential discharge to the surroundings takes place, even via the power pack 13 or equivalent to that, via a DC/DC converter or lines 33 and 34.

Figure 2A:
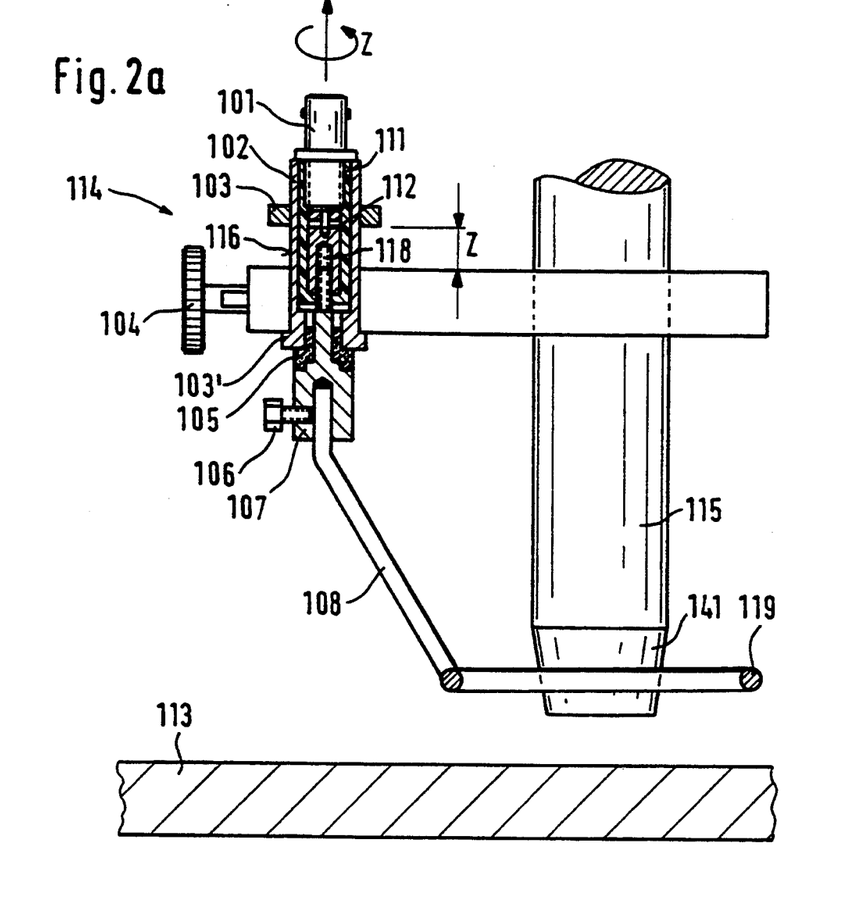
FIGS. 2a and 2b show a connection block designed as a coaxial conductor over partial segments.
Figure 2B:
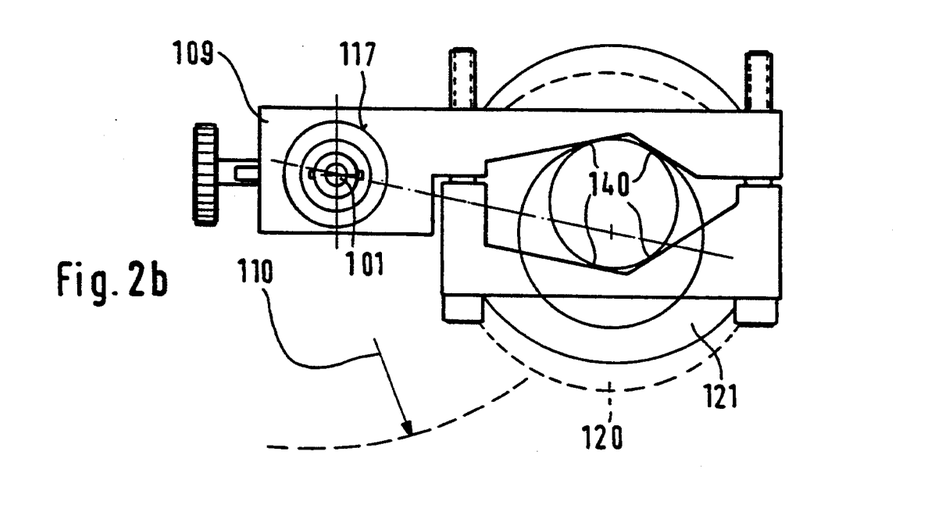

FIG. 2a shows a side view of a connection block and FIG. 2b shows a schematic top view of the same connection block. The connection block is designated in its entirety as 114, the holding mechanism as 109 and the torch as 115. The connection block 114 has a connection plug 101 which is connected to the electric power supply and evaluation units by means of a coaxial cable (not shown here). The connection plug 101 is located in a rotation-symmetrically designed insulation sleeve 111 which is surrounded by a shielding socket 102. The shielding socket 102 has a metallically conductive outer mantle 116 and is designed as a rotation-symmetrical rotational part. The connection block 114 is connected with the holding mechanism 109 via the outer mantle 116. For this purpose, the holding mechanism 109 has an opening 117 which corresponds to the rotation-symmetrical shape of the outer mantle 116. By means of an adjustable clamping element 104, it is possible to clamp the connection block 114 which can be slid in a straight line into the opening 117. In order to limit the sliding path, there are two stop elements 103 and 103' on the outer mantle 116 which are either adjustably 103 or rigidly 103' connected to the shielding socket. Inside the insulation sleeve 111, there is a conductive connection piece 118 which connects the coaxially positioned conductor 112 of the connection plug 101 with an attachment piece 107 which secures the holding rod 108 of the sensor element 119. The holding rod 108 is connected non-positively so as to be conductive via a pin with the attachment piece 107. The holding rod can be easily replaced by means of a screw element 106. Between the attachment piece 107 and the shielding socket 102, there is an insulator, preferably a ceramic insulator 105.

Due to the rotation-symmetrical shape, the shielding socket can be rotated inside the opening 117 as well as around its axis. As a result, it is advantageously possible to swivel, relative to the tool 115, the sensor element which is designed, for example, as a ring. As a result, in spite of the use of the holding mechanism described in utility model G 90 01 081, the deviations which still exist between the torch axis and the middle axis of the connection block can be compensated for. This is especially necessary in small annular sensor elements.

Due to the connection block 114, segments of which are designed as an electric conductor, an increase is achieved in the measuring accuracy for detecting alternating fields which are transmitted by the workpiece 113 designed as a transmitting antenna, since a high directional effect is achieved by the shielding socket 102 and the insulation sleeve 111 in interaction with the conductor 112, the connection piece 118 and the attachment piece 107. A field detection is achieved primarily in the direction of the workpiece 113 which is designed as a transmitter. As a result, it is advantageously possible to use a sensor element 119 with smaller dimensions.

Figure 3:
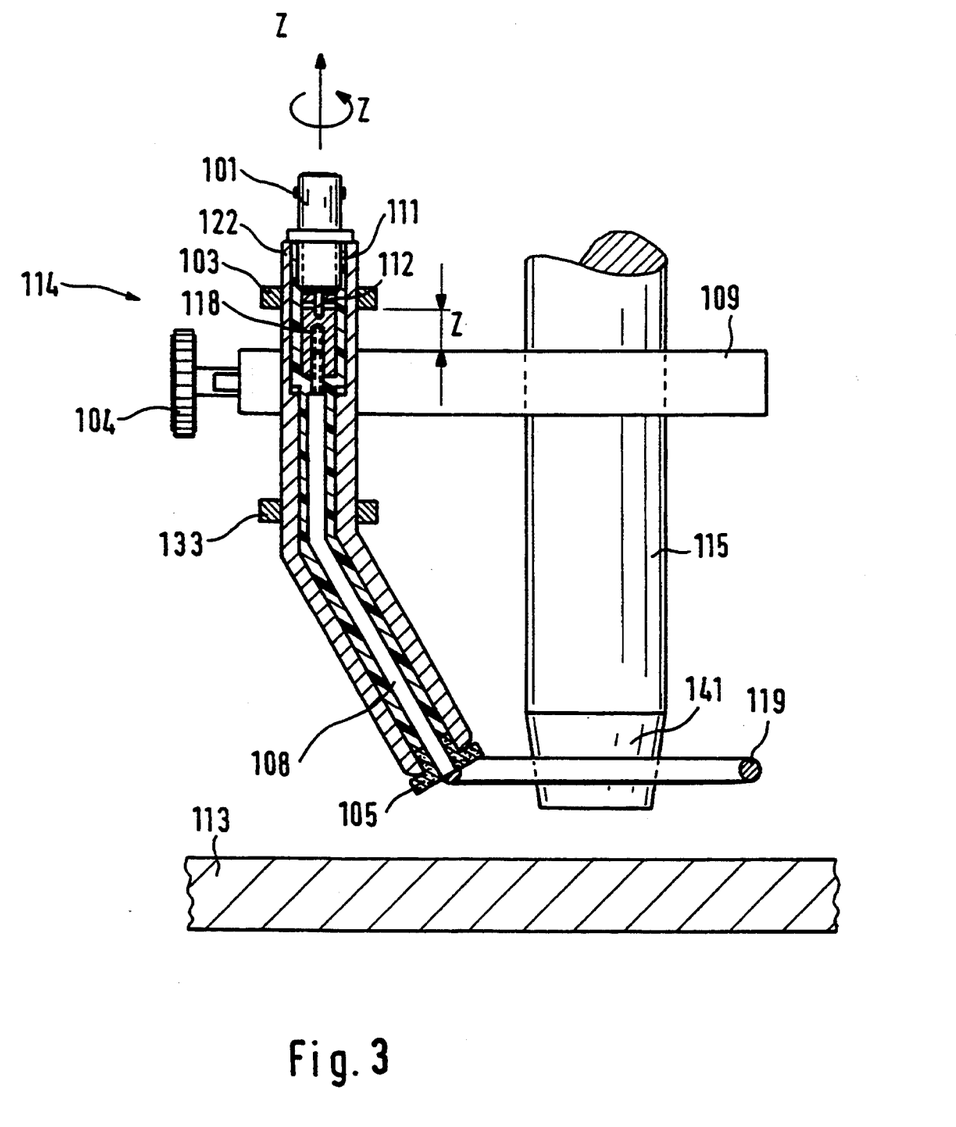
FIG. 3 shows a connection block designed as a coaxial conductor all the way to the sensor element.

FIG. 3 shows another advantageous embodiment, whereby the connection block 114 is designed as a coaxial conductor all the way to the sensor element 119. The same reference numbers are used for the same components in FIG. 3.

In contrast to the connection block 114 shown in FIG. 2, in FIG. 3, the shielding socket 122 continues to be laid coaxially in the direction of the sensor element 119. The shielding socket 122 and optionally the insulation sleeve 111 which runs through it surround the holding rod 108 all the way to the immediate vicinity of the detachable or fixed connection site with the sensor element 119. The end is formed by the ceramic insulator 105 which is shown only schematically in FIG. 3. Due to this design of the connection block 114 as a coaxial conductor extending all the way to the sensor element 119, any influences which might distort the measuring results are completely avoided.

In the connection block shown in FIG. 2 and FIG. 3, the parts are coated with a material which reduces the adhesion forces of the slag scraps; they can be can be coated, for example, with chromium, nickel, etc. or else partially or completely with plastic or ceramics which are resistant to high temperatures. If electrically insulating coating materials are used, the surfaces of the opening 117 and of the torch attachment 140 of the holding mechanism must remain uncoated.

The sensor elements 119 designed in the shape of a ring, horseshoe or plate can be attached in several places to a holding mechanism 109 if this holding mechanism carries several tools as is the case, for example, with multiple torch aggregates. Of course, via a drive device (not shown here), it is also advantageously possible to automatically move the connection block 114 translationally or rotationally. In this manner, the sensor element 119 can automatically be adjusted via a control (not shown here) to a prescribed distance from the workpiece 113 or from the nozzle 141 and from the torch middle axis. An automatic positioning relative to the nozzle 141 is possible in order to establish the same conditions for a distance measurement in machining systems with nozzle or torch replacement systems.

FIG. 2b schematically shows the adjustment of the sensor element 119 in the case of different torch diameters. The number 110 refers to the axis around which the position of sensor element 119 can be corrected relative to the torch 115 when the torch diameter changes.

In this process, the sensor element 119 designed as a ring moves relative to the middle axis of the torch on the one radius around the axis 110.

Thus, on the basis of the rotational degree of freedom, the sensor element 119 can always be positioned centrally with respect to the torch nozzle. By designing the inner surfaces 140 as a non-linear function, the annular sensor element 119 and the torch can be aligned absolutely coaxially, since the middle axis of the torch them moves exactly on a radius around axis 110.

Figure 4:
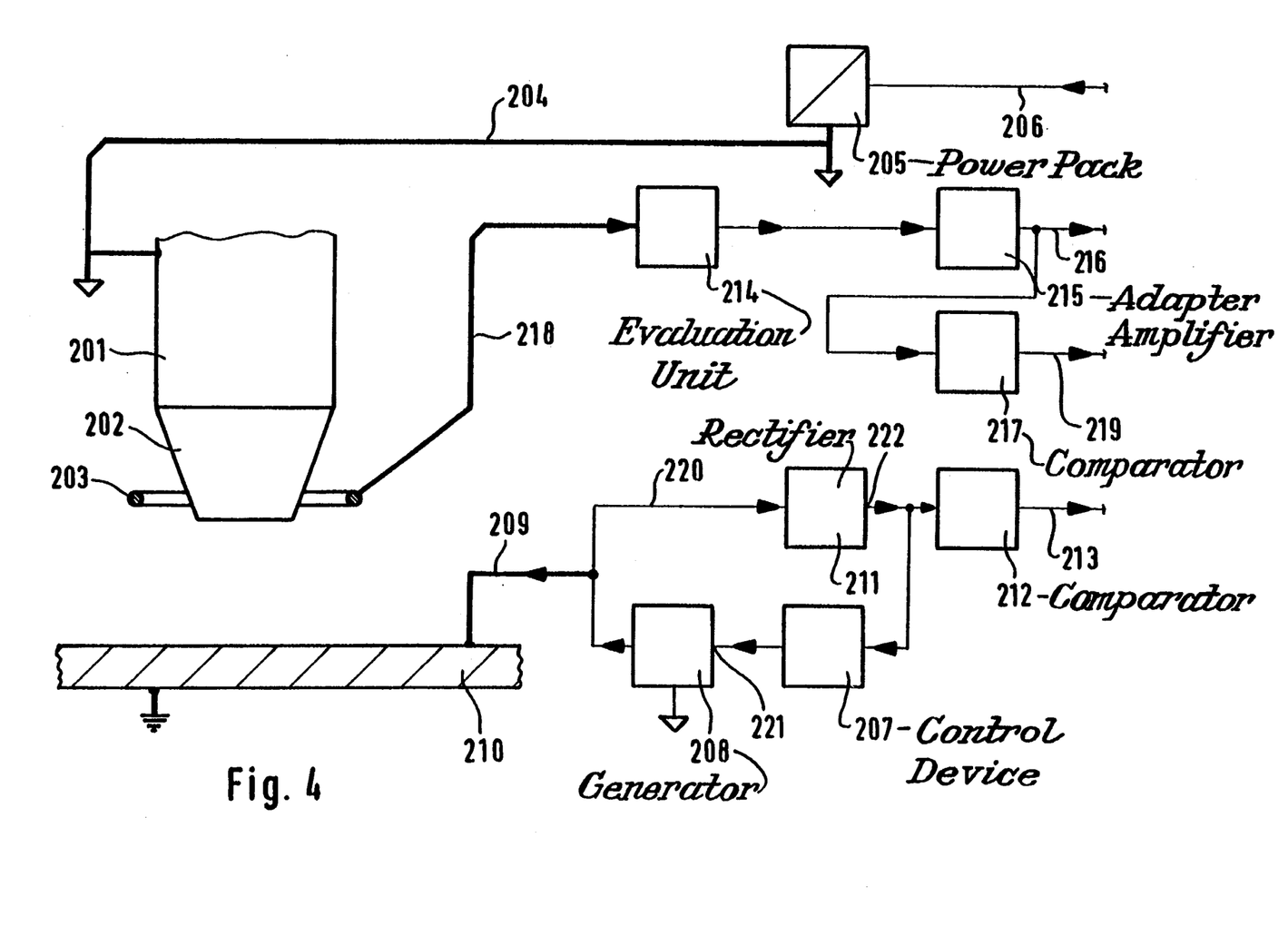
FIG. 4 shows a block diagram of the device for generating a collision signal according to the invention.

The sensor shown in FIG. 4, which receives and processes the alternating voltage signals transmitted from the workpiece 210 by means of the sensor ring 203, carries them via coaxial cable 218 to the electronic evaluation unit 214 and makes them available as a set point value for the distance to a control circuit (not shown here) via the adapter amplifier 215 at output 216. From this control signal, in a known manner, it is possible to obtain a digital collision signal of the sensor ring 203 with the workpiece 210 during the control operation by means of the comparator 217 as a function of the sign and level of the control signal.

Since the supply of the sensor via the power pack 205 is done potential-free, it is possible to directly apply the output signal of the generator 208 to the workpiece 210 via a cable 209.

The invention requires that the supply voltage zero of the sensor be connected to the torch nozzle 202 via line 204 on the torch 201 which is mounted so as to be insulated with respect to the workpiece potential.

The generator 208 is designed according to the invention as an amplitude-controlled oscillator. For this purpose, the output signal of the generator is returned via line 220 and rectifier 211 of the control device 207 at the control input 221 of the oscillator.

Due to this measure, the oscillator amplitude is kept virtually constant over a large stress range. If the torch nozzle 202 touches the workpiece 210, then the oscillator, which is connected to the supply voltage zero of the sensor, is short-circuited. The voltage at the output 222 of the rectifier 211 breaks down below a certain value.

The comparator 212 which is also connected to the output 222 has a preset threshold which lies above the value at which the direct voltage at output 222 of the rectifier 211 breaks down.

If the value falls below the threshold, the digital signal for torch collision is activated at the output 213 of the comparator 212.

Figure 5:
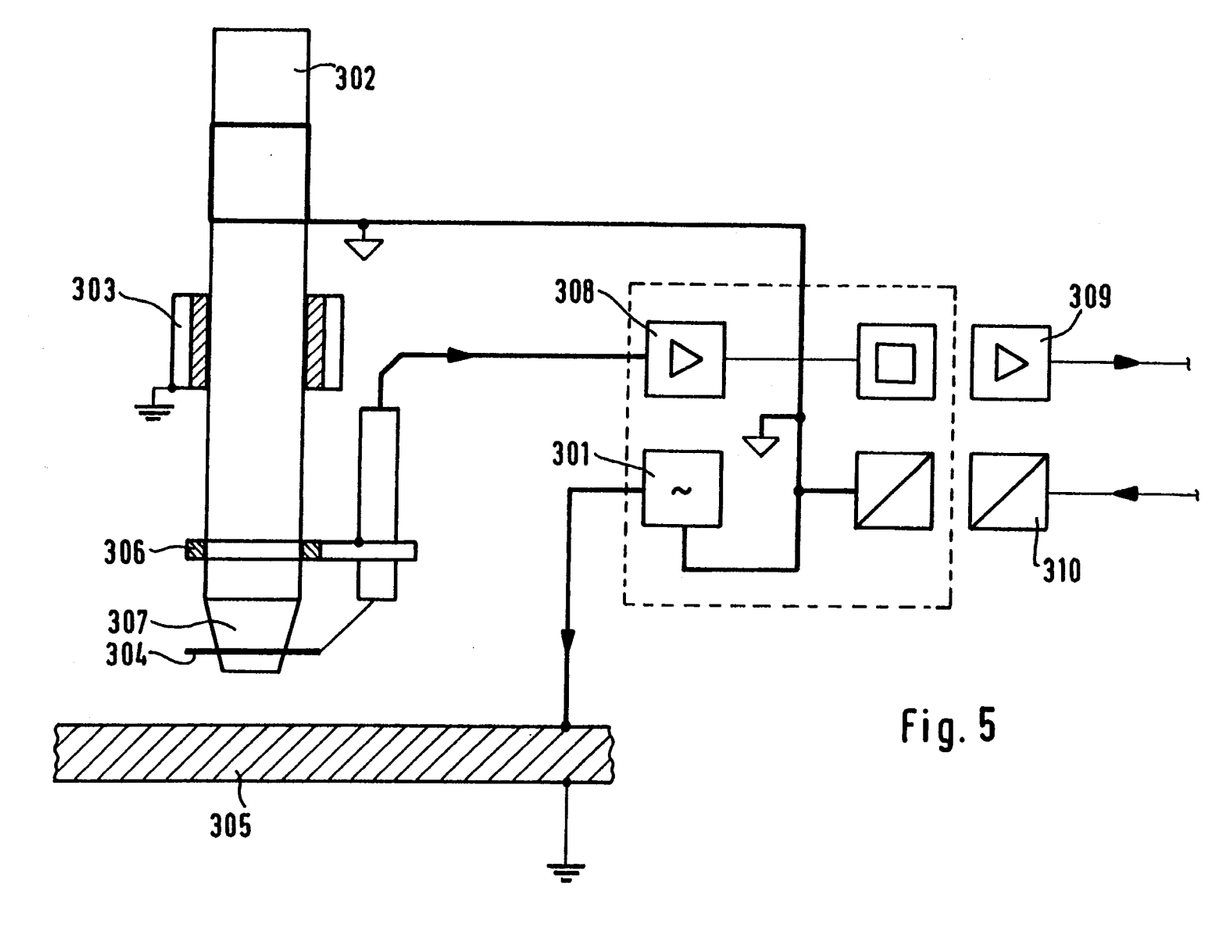
FIG. 5 shows the arrangement of the device components according to the invention.

FIG. 5 schematically shows a torch 302 which is attached onto the thermal machining system by means of a tool holder 303. On the torch 302, a sensor ring 304 is attached above a sensor holder 306. The sensor ring 304 surrounds the torch nozzle 307 concentrically. The workpiece is positioned below the torch nozzle 307 and the sensor ring 304. The sensor ring 304 is connected with an isolating amplifier 309 via an evaluation unit 308. The workpiece 305 designed as a transmitter is connected with a generator 301 which is connected to the power mains via a potential-separated voltage supply 310.

The fixed reference point of the generator 301 as a potential-free electronic zero potential of the sensor electronic element 311 is connected to the tool 302 kept insulated with the tool holder 303 whereby, during the sensor balancing at the working height of the torch nozzle 307 above the sheet metal to be processed, a certain parasitic capacity is formed between the sensor ring 304 and the tool 302 and it is also balanced. This balancing takes place without a flame and without plasmas. The parasitic capacities generated by the flame or by the plasmas in their various forms only influence these capacities to a negligible extent and thus do not affect the distance signal. The actual measuring path from the sensor ring 304 to the workpiece 305 is not influenced by the change in the parasitic capacity from the sensor ring 304 to the workpiece 305.

Figure 6:
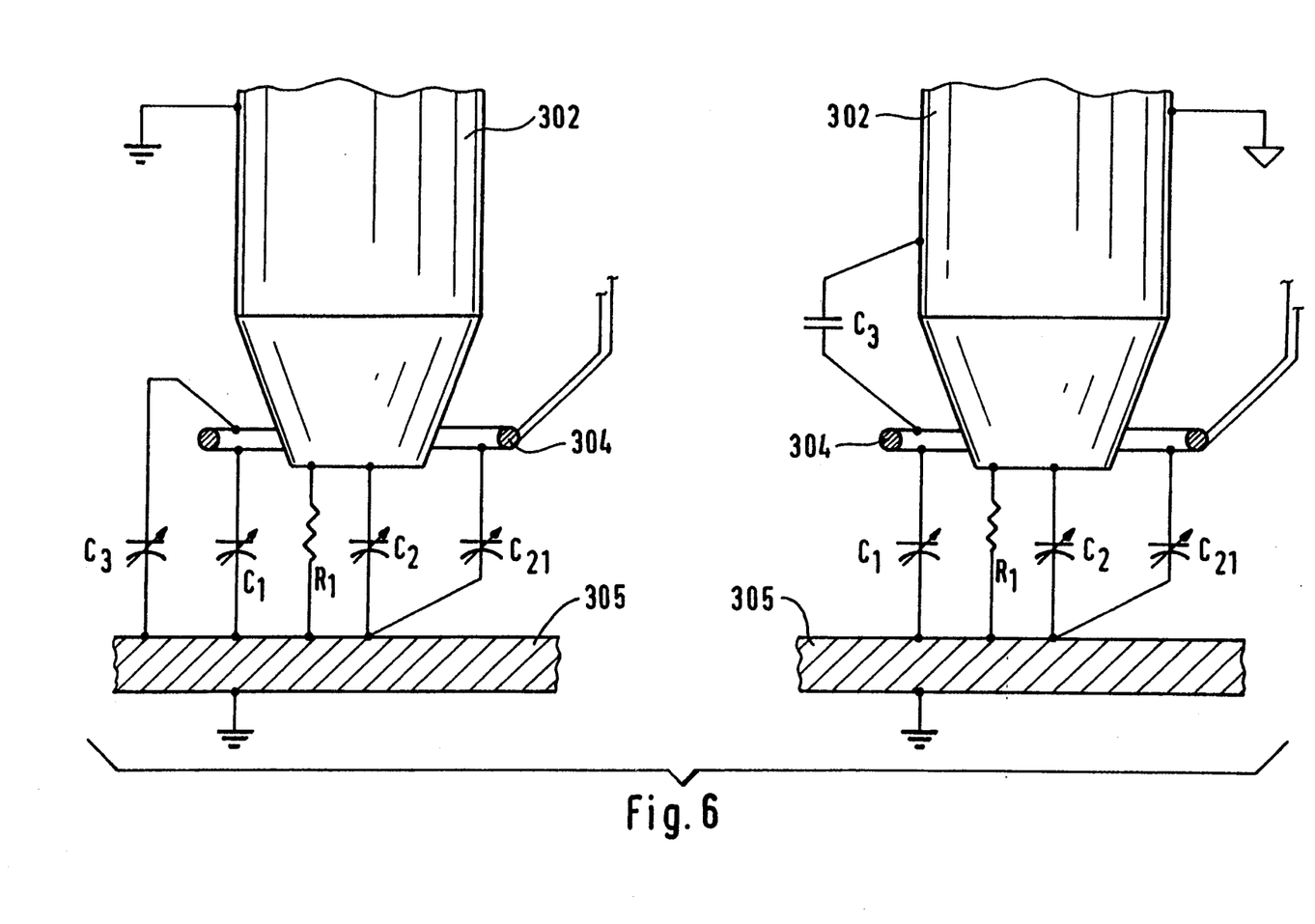
FIG. 6 shows a comparison of a 2-electrode arrangement with parasitic capacities in the state of the art and in the invention.

FIG. 6 shows the plasma-related interference effects on capacitive sensor systems, whereby on the left-hand side of the picture, the tool 302 is connected to the machine mass and on the right-hand side of the picture, the tool 302 is connected to the potential-free electronic zero according to the invention. As can be seen in the drawing, the parasitic capacities C2 between the flame and the tool 302 as well as C21 between the flame and the sensor ring remain in existence. Whereas the parasitic capacity C3 between the sensor ring 304 and the torch 302 is not balanced during the sensor balancing in the left-hand picture, but rather is added to C1, on the right-hand side, it can be recognized that C3 always relates to the torch 302 and thus cannot be added to C1.

Figure 7:
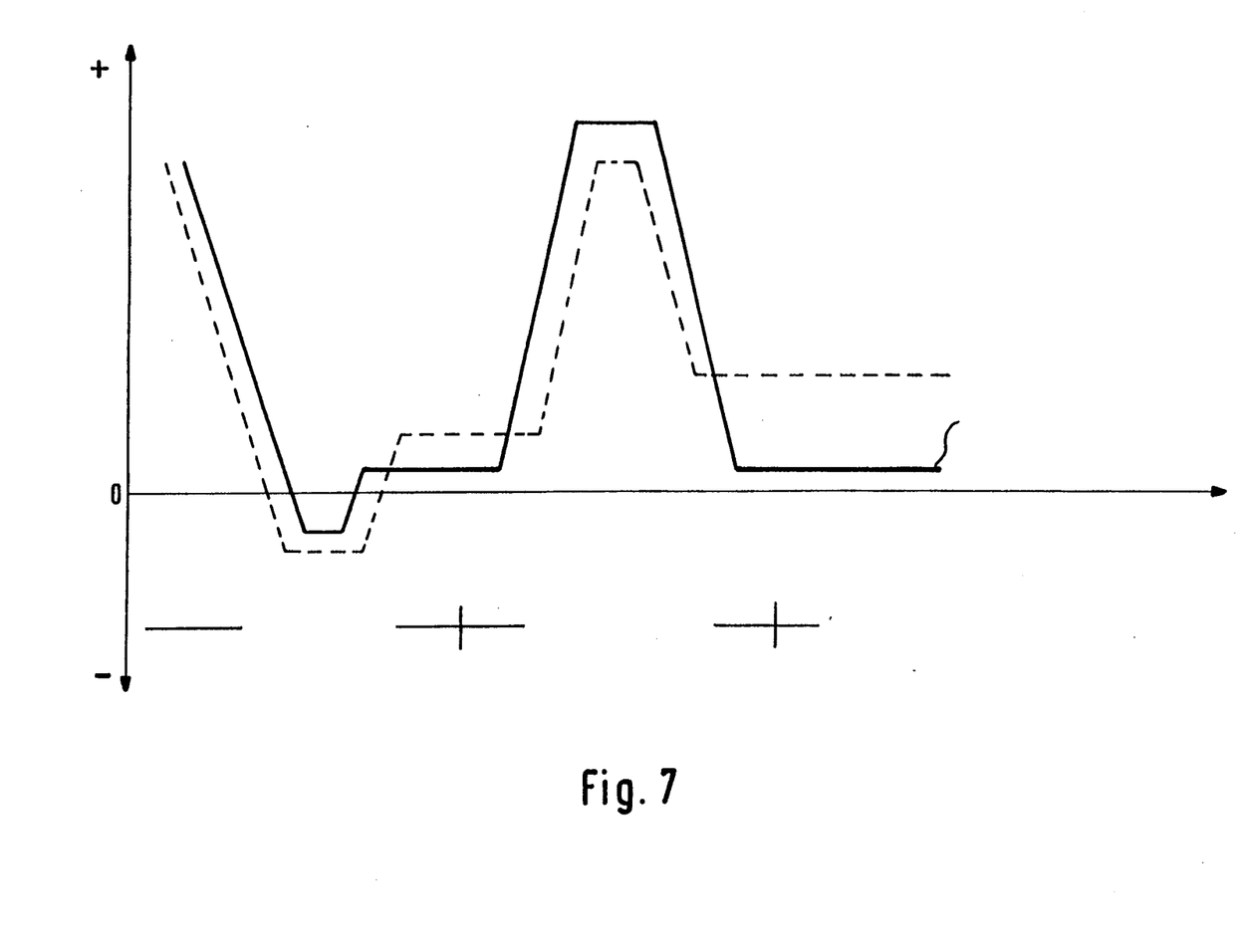
FIG. 7 is a graph of the distance fluctuations during the process phases using the example of the autogenic process with acetylene-oxygen-plasma with and without torch electronics zero (qualitative).

FIG. 7 schematically shows the signal course of the distance signal generated by the sensor electronic element 311. The broken line shows the course which arises when the tool 302 is connected to the machine mass and the continuous line shows the course when the tool 302 is connected to the potential-free electronic zero according to the invention. The ascertained distance fluctuations during the process phases, using the example of an autogenic welding process with acetylene-oxygen-plasma, show a slighter deviation with a preselected working height zero with the initial height detection as well as during the cutting procedure.

What is claimed is:

1. In a device for contact-free data gathering from a machining system with at least one machining tool and one workpiece, the improvement being in that a transmitter is formed by connecting the workpiece to an alternating voltage generator and the workpiece receives an alternating voltage signal, said transmitter generating an electrical alternating field, a receiver being maintained at a given constant height above the workpiece, and said receiver being connected to an evaluation unit which picks up electrical alternating field changes.

2. Device according to claim 1, characterized in that a transformer is between said alternating voltage generator and the workpiece whereby said transformer amplifies the voltage of said alternating voltage signal.

3. Device according to claim 1 characterized in that said evaluation unit is potential-free, by coupling out the sensor signal via an isolating amplifier and the voltage supply of said evaluation unit comes from a potential-separated DC/DC converter.

4. Device according to one of claim 1, characterized in that said alternating voltage signal from said generator is fed to an inverter for reversing the polarity of the signal and conveying the reversed signal to an adjustment element, said adjustment element being connected to a coupling capacitor, via which the compensation alternating voltage signal can be fed to a preamplifier for adjusting the amplitude of the signal.

5. Device according to claim 4 characterized in that said adjustment element is a D/A transformer.

6. Device according to claim 5 characterized in that said reference input of the D/A transformer receives the 180° phase-rotated signal from said inverter and the analog output of said D/A transformer is connected with said coupling capacitor.

7. Device according to claim 6, characterized in that said coupling capacitor has a fixed value and the compensation influence of the inverted alternating voltage and generator are produced via a variable voltage.

8. Device according to claim 1 characterized in that the workpiece and said receiver comprises a sensor, several of said sensors being formed by several receivers on the same workpiece, and the generator frequency for said several sensors on the same workpiece being different.

9. Device according to claim 1, characterized in that said receiver has a sensor element which is connected to a holding device of the machining system via a connection block, and said connection block is designed as a coaxial conductor.

10. Device according to claim 9, characterized in that said connection block is connected with said holding device via a metallic outer mantle so as to be conductive.

11. Device according to claim 10, characterized in that said connection block is slidable in a straight line.

12. Device according to claim 10, characterized in that said outer mantle has a rotation-symmetrical shape and has two stop elements, and at least of said stop elements is attached adjustably on said outer mantle.

13. Device according to claim 10, characterized in that at least the end section of said connection block is electrically insulated with a heat-resistant material.

14. Device according to claims 10, characterized in that said connection block is moved by power means.

15. Device according to claim 10, characterized in that said connection block has indicia on its outer mantle for the reproducible adjustment of various positions of said sensor element.

16. Device according to claim 1, characterized in that said receiver is connected with a potential-separated voltage supply, and said machining tool is electrically insulated with respect to the workpiece potential, and said alternating voltage generator is designed as an amplitude-controlled oscillator.

17. Device according to claim 16, characterized in that the output signal of said generator can be returned via a rectifier and a control device at the control input of the generator.

18. Device according to claim 17, characterized in that the output of said rectifier is connected with a comparator.

19. Device according to claim 1, characterized in that said machining system is a thermal machining system.

20. Device according to claim 19, characterized in that in order to minimize plasma-induced interference effects, said machining tool is designed as one of the sensor elements and has the same reference potential as the frequency-generating generator of the sensor.

21. Device according to claim 19, characterized in that the tool is a torch.

22. Device according to claim 20, characterized in that least parts of said torch are insulated with respect to the thermal machining system.

23. Device according to claim 1, characterized in that said machining system is a water-jet machining system.

24. Device according to claim 1, characterized in that said evaluation unit is potential-free by coupling out the sensor signal via an isolating amplifier, and the voltage supply of said evaluation unit comes from a power pack.

25. Device according to claim 4, characterized in that said adjustment element is a potentiometer.

26. Device according to claim 9, characterized in that said coaxial conductor extends completely to said sensor element.

27. Device according to claim 9, characterized in that said coaxial conductor is over a partial segment.

28. Device according to claim 10, characterized in that said connection block is rotatable.

29. Device according to claim 23, characterized in that said tool is a nozzle.

* * * * *